United States Patent [19]

Jacob

[11] Patent Number: 5,301,034
[45] Date of Patent: Apr. 5, 1994

[54] PRODUCTION OF PROPERLY ORIENTED COPIES OF TRANSPARENT MASTERS

[75] Inventor: Friedrich Jacob, Munich, Fed. Rep. of Germany

[73] Assignee: Agfa-Gevaert Aktiengesellschaft, Leverkusen, Fed. Rep. of Germany

[21] Appl. No.: 759,892

[22] Filed: Sep. 13, 1991

[30] Foreign Application Priority Data

Oct. 2, 1990 [DE] Fed. Rep. of Germany ....... 4031107

[51] Int. Cl.$^5$ ............... H04N 1/04; H04N 1/21; H04N 1/23; H04N 1/387; G01B 5/28
[52] U.S. Cl. .................. 358/406; 358/444; 358/487; 358/302
[58] Field of Search ............ 358/302, 487, 406, 76, 358/506, 527, 444; 355/20, 40, 44, 55, 68, 77; 346/110 R; 73/105

[56] References Cited

U.S. PATENT DOCUMENTS

| | | | |
|---|---|---|---|
| 3,934,081 | 1/1976 | Schumacher | 355/20 |
| 4,106,333 | 8/1978 | Salje et al. | 73/105 |
| 4,659,213 | 4/1991 | Matsumoto | 355/ |
| 4,765,181 | 8/1988 | Numoto et al. | 73/105 |
| 4,776,212 | 10/1988 | Parsons et al. | 73/105 |
| 4,888,984 | 12/1989 | Marumo et al. | 73/105 |
| 5,001,513 | 3/1991 | Tokuda | 355/43 |
| 5,092,676 | 3/1992 | Harata et al. | 356/371 |

FOREIGN PATENT DOCUMENTS 3426503 1/1985 Fed. Rep. of Germany .
3635386 4/1987 Fed. Rep. of Germany .
3820551 12/1988 Fed. Rep. of Germany .

Primary Examiner—Edward L. Coles, Sr.
Assistant Examiner—Scott A. Rogers
Attorney, Agent, or Firm—Darby & Darby

[57] ABSTRACT

A transparent master is mechanically sensed to detect the emulsion. The master is then advanced into a projection arrangement where a scanner scans the master point-by-point and line-by-line to generate signals containing data on the master. The signals are entered in a memory and electronically enhanced. The enhanced signals are sent to a cathode ray tube which produces a printing beam responsive to the signals. The printing beam prints an image of the master on copy material. If sensing of the emulsion indicates that the master is inverted, the image of the master is electronically inverted in the projection arrangement to thereby obtain a normal copy. The electronic inversion can be accomplished in any one of several ways as follows: (i) reversing the order in which the signals are generated by the scanner; (ii) reversing the order in which the signals are entered in the memory; (iii) reversing the order in which the signals are retrieved from the memory; or (iv) reversing the direction of movement of the printing beam.

25 Claims, 2 Drawing Sheets

PRODUCTION OF PROPERLY ORIENTED COPIES OF TRANSPARENT MASTERS

BACKGROUND OF THE INVENTION

The invention relates generally to the reproduction of a master or original.

More particularly, the invention relates to the production of correctly oriented copies of a transparent master, especially a diapositive which is framed without glass, using a procedure in which the master is photoelectrically scanned point-by-point and line-by-line. The printing or imaging signals generated during scanning are entered in a memory. The image represented by the printing signals is subsequently printed on light-sensitive copy material point-by-point and line-by-line in that the signals are read out from the memory and used to control a printing beam.

A difficulty exists in the production of copies of a framed diapositive. This difficulty stems from the fact that the marks at the margins of the diapositive are covered by the frame and are thus not available to determine whether the diapositive is properly oriented on the copying platform. As a rule, and particularly when so-called service frames are involved, the two sides of the frame of a diapositive are differently colored. One side is white and the frame is positioned so that such side faces the light source which is used to transilluminate the diapositive and project an image of the same onto the copy material. On the one hand, this reduces heating of the frame. On the other hand, for the purpose of placing the framed diapositive on the copying platform of a copying apparatus, it can be assumed that the emulsion is located on the side of the frame which faces away from the white side.

However, in addition to diapositives in service frames, there are diapositives which have been framed by amateurs fond of photographs. Furthermore, for reasons which are not always clear, diapositives are sometimes removed from a service frame and then improperly replaced because of a lack of knowledge of the proper orientation. Diapositives which are placed on the platform in a inverted position naturally result in inverted copies.

The patent literature discloses methods which make it possible to detect the emulsion by machine even when a diapositive is framed without glass. See, for example, the German Offenlegungsschrift 36 35 386. The method described here is based on the fact that, when a directed light beam impinges upon the emulsion of a developed photographic film, the reflected beam contains a higher proportion of scattered light than a beam reflected from the opposite side of the film. When a framed diapositive lying on the copying platform is found to be improperly oriented using this method, the diapositive must be removed, rotated and once again placed on the platform. This causes a considerable delay in the copying procedure.

Another method for detecting the position of the emulsion is described the German Offenlegungsschrift No. 40 31 108 of the present assignee. Here, the coarseness of one side of a film is determined by means of a sensing head and compared with the coarseness of the other side. This makes it possible to immediately ascertain when the emulsion faces in the wrong direction. However, there is again the problem of bringing an improperly oriented film into the correct position without a substantial loss of time.

SUMMARY OF THE INVENTION

It is an object of the invention to provide a method which allows properly oriented copies to be readily obtained from a master even though the master is found to be positioned incorrectly.

Another object of the invention is to provide a method which makes it possible to avoid the production of inverted copies when the emulsion of a diapositive framed without glass is found to be facing in the wrong direction during the course of a copying procedure.

An additional object of the invention is to provide an apparatus which enables correctly oriented copies to be readily obtained from a master in spite of the fact that the master may be improperly positioned.

A further object of the invention is to provide an apparatus which permits the production of inverted copies to be avoided when the emulsion of a diapositive framed without glass is found to be facing in the wrong direction during the course of a copying procedure.

The preceding objects, as well as others which will become apparent as the description proceeds, are achieved by the invention.

One aspect of the invention resides in a method of copying a master or original, particularly a transparent master or original, having an emulsion. The method comprises the steps of detecting the emulsion; forming an image of the master on copy material; and regulating the forming step so that the image is correctly oriented on the copy material regardless of whether the emulsion has a normal or inverted orientation during the forming step. The master may, for example, be constituted by a diapositive which is framed without glass.

The forming step may comprise scanning the master point-by-point and line-by-line, preferably photoelectrically, to generate printing or imaging signals, and printing the image on the copy material point-by-point and line-by-line using a printing beam controlled by the printing signals. The regulating step may involve regulation of the printing beam.

The forming step may further comprise storing the printing signals between scanning and printing.

The method may additionally include the step of conveying the master along a predetermined path. Scanning may here be performed at a first location of the path while detection of the emulsion is performed automatically during conveying at a second location of the path upstream of the first location.

The surface of the master which is opposite, or faces away from, the emulsion will generally be smoother than the latter. The step of detecting the emulsion may thus be carried out by sensing both the emulsion and the surface of the master facing away therefrom. It is preferred for such sensing to be performed mechanically.

The regulating step may include electronically inverting the image of the master when the emulsion is in the inverted orientation during the forming step. According to one embodiment of the method, this is accomplished in that the printing signals are issued in a first order when the emulsion is in the normal orientation and in a reverse second order when the emulsion is in the inverted orientation.

In accordance with another embodiment of the method, the regulating step involves entering the printing signals into storage in a first order when the emulsion is in the normal orientation and entering the signals into storage in a reverse second order when the emulsion is in the inverted orientation. The image is then inverted when the emulsion is in the inverted orientation.

A further embodiment of the method provides for the regulating step to be performed by retrieving the printing signals from storage in a first order when the emulsion is in the normal orientation and in a reverse second order when the emulsion is in the inverted orientation. In the latter case, the image is again inverted.

According to an additional embodiment of the method, electronic image inversion is achieved in that the regulating step comprises moving the printing beam in a first direction when the emulsion is in the normal orientation and in an opposite second direction when the emulsion is in the inverted orientation. For example, if the beam is moved from left to right along the scanning lines when the emulsion is in the normal orientation, the beam is moved from right to left when the emulsion is in the inverted orientation.

Scanning of the master may take place in a predetermined plane and the forming step then comprises focusing the image of the master in such plane regardless of whether the emulsion is in the normal orientation or the inverted orientation. When the emulsion is in the inverted orientation and the image would be focused in the predetermined plane if the emulsion were properly oriented, focusing may involve shifting of the focal plane of the image by a distance substantially equal to the average thickness of the emulsion carrier.

Shifting of the focal plane may be carried out by moving at least one lens from a first position to a second position. The master will generally be positioned at a predetermined location during the forming step, and the lens may then be automatically moved from the second position to the first position upon removal of the master from the predetermined location.

In a similar manner, if the image of the master is electronically inverted by changing an inverting device from a first condition to a second condition, this inverting device may be automatically changed from the second condition to the first condition upon removal of the master from the predetermined location.

Another aspect of the invention resides in an apparatus for copying a master, particularly a transparent master, having an emulsion. The apparatus comprises means for detecting the emulsion; means for forming an image of the master on copy material; and means for regulating the forming means in response to the detecting means so that the image is correctly oriented on the copy material regardless of whether the emulsion has a normal or inverted orientation in the forming means.

The apparatus according to the invention is particularly well-suited for carrying out the method of the invention.

The forming means may comprise means, preferably photoelectric means, for scanning the master point-by-point and line-by-line, and means for printing the image on the copy material point-by-point and line-by-line. The scanning means may include means for generating printing signals while the printing means may include means for producing a printing beam which is controlled by the printing signals. The printing beam may further be regulated by the regulating means.

The forming means may additionally comprise means for storing the printing signals, and such storing means or memory may be disposed between the scanning means and the printing means.

The forming means may also comprise means for focusing the image on the scanning means, and means for adjusting the focusing means so that the image can be focused on the scanning means regardless of whether the emulsion is in the normal or inverted orientation.

The regulating means may include means for electronically inverting the image when the emulsion in in the inverted orientation in said forming means. In accordance with one embodiment of the apparatus, the image is electronically inverted in that the regulating means causes the signal generating means to issue the printing signals in a first order when the emulsion is in the normal orientation and in a reverse second order when the emulsion is in the inverted orientation.

According to another embodiment of the apparatus, the regulating means regulates the storing means so that the printing signals are entered in the storing means in a first order when the emulsion is in the normal orientation and in a reverse second order when the emulsion is in the inverted orientation. The image is then inverted when the master is positioned with the emulsion in the inverted orientation.

In a further embodiment of the apparatus, the regulating means achieves electronic inversion of the image by causing the printing signals to be retrieved from the storing means in a first order when the emulsion is in the normal orientation and in a reverse second order when the emulsion is in the inverted orientation.

An additional embodiment of the apparatus provides for the image to be electronically inverted in that the regulating means regulates the printing beam so that the beam moves in a first direction when the emulsion is in the normal orientation and in an opposite second direction when the emulsion is in the inverted orientation.

Increasingly, copies of transparent masters which are difficult to copy are no longer being made by directly projecting an image of the master onto the copy material via an objective. Rather, the master is scanned point-by-point and line-by-line to generate printing or imaging signals which are stored in a memory and electronically processed for image optimization. The printing signals are then used to control a printing beam which prints an image of the original on the copy material point-by-point and line-by-line. With a procedure of this type for image production, electronic control means make it possible to scan an inverted master on the scanning platform in the same manner as a correctly oriented master. The printing signals may, however, be modified in such a fashion in the scanning means, printing means, input means of the memory or output means of the memory by changing the order of the signals along the scanning lines that a correctly oriented image is nevertheless obtained.

The novel features which are considered as characteristic of the invention are set forth in particular in the appended claims. The improved copying method, as well as the construction and mode of operation of the improved copying apparatus, will, however, be best understood upon perusal of the following detailed description of certain specific embodiments when read in conjunction with the accompanying drawings.

DESCRIPTION OF THE PREFERRED EMBODIMENTS

Figure 1:
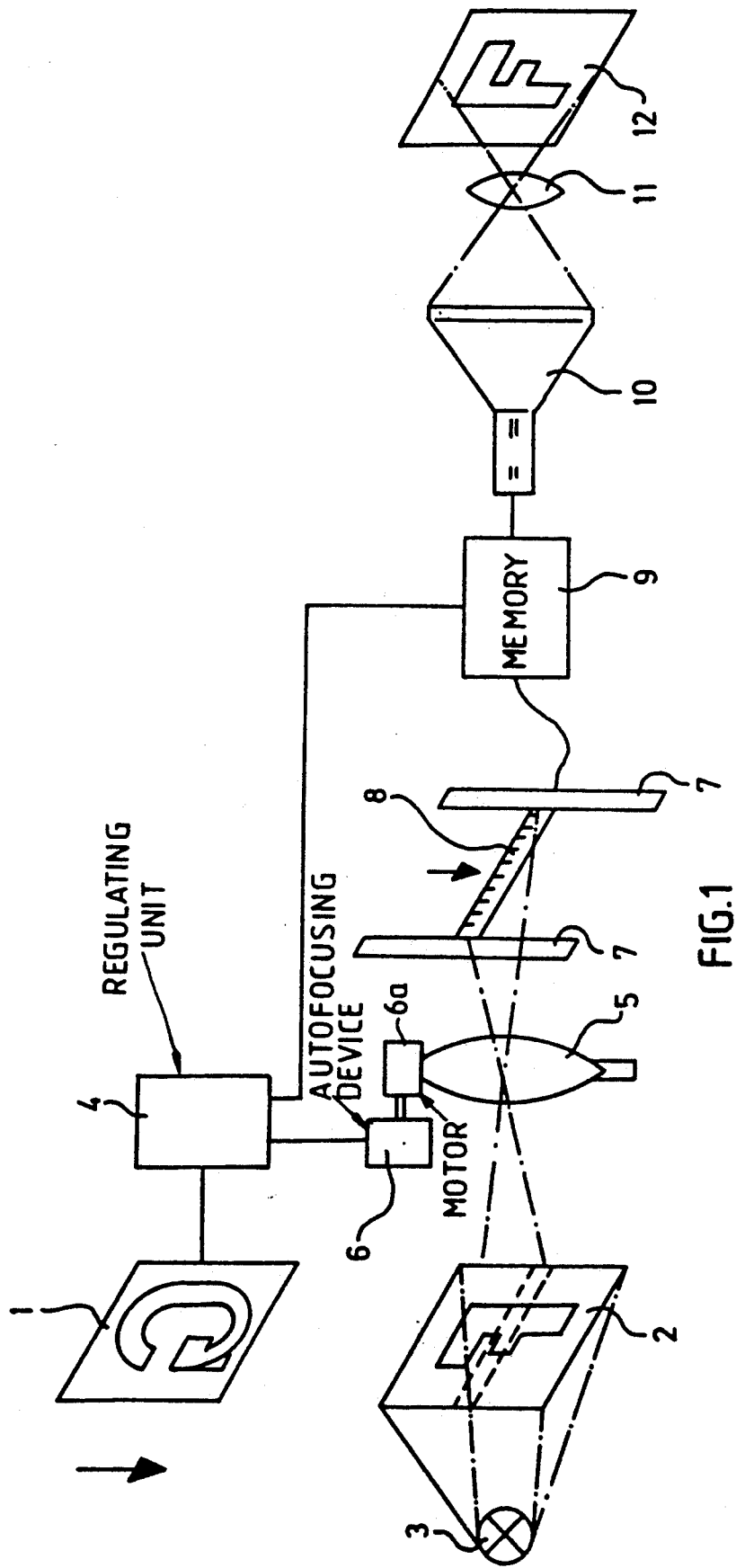
FIG. 1 schematically illustrates a copying apparatus according to the invention for producing correctly oriented copies of inverted masters.
Figure 2:
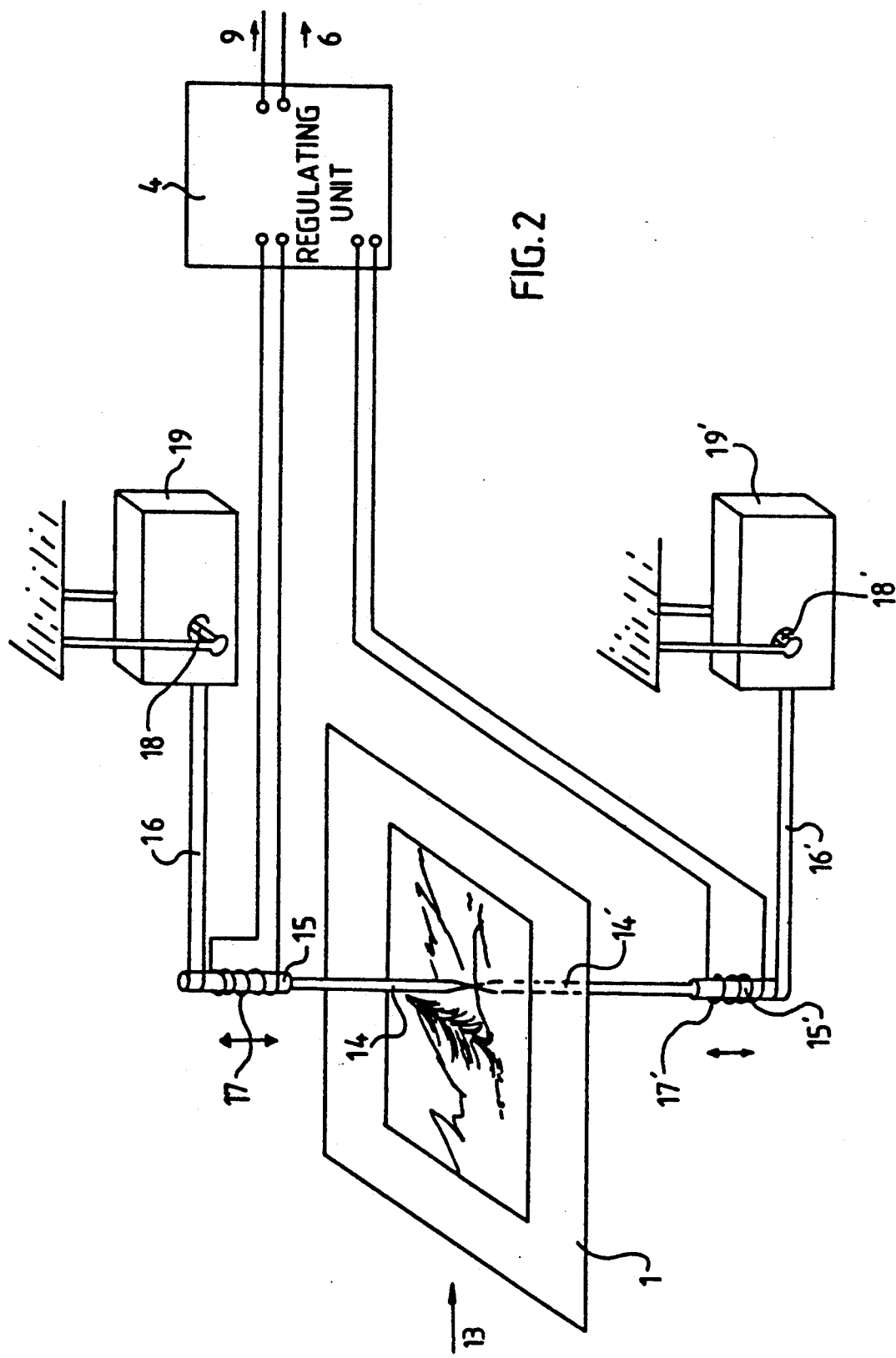
FIG. 2 schematically illustrates a device which can be used in the apparatus of FIG. 1 to detect the emulsion of a master.

FIG. 1 shows an apparatus for the reproduction of masters or originals. The reference numeral 1 identifies a master or original in the form of a photographic diapositive which is framed without glass. The diapositive 1 is conveyed along a predetermined path in a direction indicated by an arrow 13 (FIG. 2). In FIG. 1, the diapositive 1 is disposed at a first location along its path of travel. The first location is situated in a detecting unit or device which functions to detect the emulsion of the diapositive 1 and thus determine whether the diapositive 1 is correctly or incorrectly positioned for copying, i.e., whether the diapositive 1 has a normal or inverted orientation. The diapositive 1 continues to move in the direction of the arrow 13 during the detection procedure.

A second location along the path of travel of the diapositive 1 is situated downstream of the first location and, in the illustrated condition of the copying apparatus, is occupied by a second diapositive 2. The second location lies outside of the detecting unit and in an optical path for copy light. The diapositive 2 carries the letter F which is properly oriented with respect to the optical or projection arrangement defining the optical path. The diapositive 2 is transilluminated by a source 3 of copy light, and an image of the diapositive 2 is focused in a predetermined plane by an objective 5. A linear charge-coupled device or CCD 8 constituting part of a photoelectric scanning unit is located in the predetermined plane. The CCD 8 is mounted in guides 7 and is movable along the guides 7 in the predetermined plane by means of a suitable motorized mechanism. The CCD 8 traverses the diapositive 2 as it is moved along the guides 7 and, in the process, scans the diapositive 2 point-by-point and line-by-line. The photoelectric scanning unit generates printing or imaging signals as the CCD 8 scans the diapositive 2 and these printing signals, which represent an image of the diapositive 2, are entered in an electronic memory or storage device 9 serving to store images. An electronic image processing unit, which does not constitute part of the invention per se and thus is not described here in detail, is generally associated with the memory 9. The image processing unit functions to optimize the image of the diapositive 2, and the processed printing signals representing the optimized image of the diapositive 2 are transferred to a cathode ray tube 10 which forms the optimized image on its screen. The screen of the cathode ray tube 10 is projected onto light-sensitive copy material 12 via an objective 11. To this end, the cathode ray tube 10 generates a printing beam which is controlled by the printing signals and prints the image of the diapositive 2 on the copy material 12 point-by-point and line-by-line.

Three color filters can be disposed downstream of the cathode ray tube 10 in a conventional manner. By performing three successive exposures with a different color filter in the optical path during each exposure, a tricolored image of the diapositive 2 can be printed on the copy material 12. It is further possible, in known manner, to replace the cathode ray tube 10 with a deflectable laser beam.

In order that the image of the diapositive 2 may always be focused on the CCD 8 with optimum sharpness, a so-called autofocusing device 6 is associated with the projection arrangement. By way of example, the autofocusing device 6 can employ a reflected light beam of the type frequently used in projectors. Such a light beam is reflected from a surface containing two photoreceivers and controls an adjusting motor. In the illustrated embodiment, the adjusting motor is identified by the reference numeral 6a and functions to adjust the objective 5. The motor 6a stops when the reflected beam impinges the surface with the photoreceivers precisely between the two photoreceivers. The location of the emulsion on the diapositive 2 affects the position of the objective 5 which is adjusted so that a sharp image of the diapositive 2 is formed on the CCD 8.

The detecting device for determining the location of the emulsion on a diapositive is schematically shown in FIG. 2 where the diapositive 1 is being evaluated. The detecting device senses the emulsion of the diapositive 1 as well as the surface of the diapositive 1 which is disposed opposite, or faces away from, the emulsion, and the sensing elements for the emulsion and the opposed surface are identical.

So-called sensing heads 14 and 14' are in contact with the two sides of the diapositive 1 and are provided with hard magnetic cores 15 and 15'. The cores 15,15' are mounted on carrying arms 16 and 16', and the arms 16,16' are supported on bearings 18 and 18' which are secured to the copying apparatus. The arms 16,16' and magnets 15,15' are counterbalanced to such an extent by counterweights 19 and 19' that the force applied to the diapositive 1 by the sensing heads 14,14' is at most 5 mN. Coils 17 and 17' which are secured to the copying apparatus surround the cores 15,15' and are connected to an analyzing or regulating unit 4.

The detecting device measures the coarseness of the two sides of the diapositive 1 and the operation of the device can be readily ascertained. The motions of the sensing heads 14,14' as the diapositive 1 is drawn through the detecting device in the direction of the arrow 13 are converted into vertical movements of the magnets 15,15'. The movements of the magnets 15,15' cause current pulses to be induced in the coils 17,17' and these current pulses are compared with one another in the regulating unit 4. The magnitudes of the current pulses, the number of current pulses generated in a predetermined length of the diapositive 1 and/or the maximum values of current pulses which exceed a given threshold are used to determine the coarser side of the diapositive 1. The coarser side is the side with the emulsion and a determination is made as to whether the diapositive 1 has the desired or correct orientation, that is, the normal orientation in which the emulsion faces the objective 5.

The regulating unit 4 has an output which leads to the autofocusing device 6 and another output which leads to the memory 9. At these outputs, the regulating unit 4 generates signals which indicate whether the emulsion of the diapositive currently entering the projection arrangement has a normal or inverted orientation, i.e., whether the emulsion is on the side of the diapositive which is turned towards or away from the objective 5.

Once the diapositive enters the projection arrangement, access to the diapositive becomes difficult. If the diapositive is inverted so that the emulsion is on the wrong side of the diapositive, the output signals of the regulating unit 4 can eliminate the need for mechanical rotation of the diapositive by electronically inverting the image of the diapositive or the printing signals representing the image. One manner of accomplishing this is to reverse the usual order in which the printing signals are generated by the CCD 8 and entered in the memory 9 so that the scanning direction is effectively from right to left rather than from left to right. Upon further processing of the printing signals, the image produced on the copy material 12 is inverted from the image obtained when the diapositive has its normal orientation, that is, the image produced on the copy material 12 upon further processing of the printing signals is properly oriented. Another way of electronically inverting the image of the diapositive is for the CCD 8 to generate the printing signals in the usual order but to reverse the order in which the printing signals are entered in the memory 9. It is similarly possible to reverse the order in which the printing signals are retrieved from the memory 9 when the printing signals are forwarded to the cathode ray tube 10. A correctly oriented image can also be obtained by regulating the printing beam generated by the cathode ray tube 10 so that the beam moves from right to left along the lines of the image instead of left to right. This yields an image which is inverted from that produced when the diapositive is in its normal orientation.

Concurrently with electronic inversion of the image, the regulating unit 4 can change the setting of the autofocusing device 6. The setting is changed in such a manner that a plane which cuts the optical path at the location of the diapositive and is sharply focused on the CCD 8 by the objective 5 in the normal orientation of the diapositive is shifted towards the light source 3 by a distance equal to the thickness of the emulsion carrier. In this manner, when the diapositive is inverted, the layer of the diapositive which contains the picture and is located on the side of the diapositive facing away from the objective 5 is sharply focused on the CCD 8.

The preferred orientation of a diapositive in the projection arrangement is clearly that in which the emulsion faces the objective 5 and the frame of a diapositive is provided with different colors in an attempt to achieve this orientation. As a result, only relatively few diapositives are inverted, that is, placed in the projection arrangement with the emulsion facing away from the objective 5. Accordingly, the regulating unit 4 is designed so that, upon termination of the scanning procedure for an inverted diapositive or removal of an inverted diapositive from the projection arrangement, the means for electronically inverting the image is automatically switched off and the autofocusing device 6 is automatically returned to its initial setting, i.e., the normal setting assumed by the autofocusing device 6 for a correctly oriented diapositive.

Automatic electrical image inversion is likewise readily achievable in a projection arrangement having a light source in the form of a laser, e.g., a projection arrangement where the laser beam is deflected by means of mirror wheels. Since it is difficult to reverse the direction of rotation of mirror wheels, the preferred electronic means for obtaining properly oriented images are here the generation of printing signals by the CCD 8 in reverse order and the manipulation of the image in the electronic image memory 9.

In addition to linear CCDs for photoelectric scanning of a master, there are planar CCDs which can sense an entire master line-by-line without shifting of lines. The signals generated by the lines of such a planar CCD can also be read in a reverse order to compensate for improper orientation of a diapositive in the projection arrangement.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the instant contribution to the art and, therefore, such adaptations should and are intended to be comprehended within the meaning and range of equivalence of the appended claims.

What is claimed is:

1. Apparatus for copying a master, particularly a transparent master, having an emulsion, comprising means for automatically detecting the emulsion; means for forming an image of the master on copy material, including means for scanning the master and generating printing signals, means for storing the printing signals, and means for printing the image on the copy material and including means for producing a printing beam which is controlled by printing signals in said storing means; and means for automatically regulating said forming means in response to said detecting means so that the image is correctly oriented on the copy material regardless of whether the emulsion has a normal or inverted orientation in said forming means, said regulating means regulating said storing means so that the printing signals re entered in said storing means in a first order when the emulsion is in the normal orientation and in a reverse second order when the emulsion is in the inverted orientation.

2. A method of copying a master having an emulsion and a surface facing away from said emulsion, comprising the steps of automatically detecting said emulsion, the detecting step including mechanically sensing by physical contact with said master at least one of said emulsion and said surface while preventing application of excessive force in the physical contact with said master to thereby inhibit damage thereto; forming an image of said master on copy material; and automatically regulating the forming step so that said image is correctly oriented on said copy material regardless of whether said emulsion has a normal or inverted orientation during the forming step.

3. The method of claim 2, wherein said master is transparent.

4. The method of claim 2, wherein said master comprises a diapositive which is framed without glass.

5. The method of claim 2, wherein the detecting step comprises sensing both said emulsion and said surface.

6. The method of claim 2, wherein the forming step comprises scanning said master point-by-point and line-by-line to generate printing signals, and printing said image on said copy material point-by-point and line-by-line using a printing beam controlled by said signals, said scanning being performed photoelectrically.

7. The method of claim 6, wherein the regulating step comprises regulating said beam.

8. The method of claim 6, further comprising the step of conveying said master along a predetermined path; and wherein scanning is performed at a first location of said path and detecting is performed during conveying at a second location of said path upstream of said first location.

9. The method of claim 2, wherein the forming step comprises scanning said master to generate printing signals, printing said image on said copy material using a printing beam controlled by said signals, and storing said signals between scanning and printing, the regulating step including electronically inverting said image when said emulsion is in said inverted orientation during the forming step.

10. The method of claim 9, wherein the regulating step comprises issuing said signals in a first order when said emulsion is in said normal orientation and issuing said signals in a reverse second order when said emulsion is in said inverted orientation.

11. The method of claim 9, wherein the regulating step comprises retrieving said signals from storage in a first order when said emulsion is in said normal orientation and retrieving said signals from storage in a reverse second order when said emulsion is in said inverted orientation.

12. The method of claim 9, wherein the regulating step comprises moving said beam in a first direction when said emulsion is in said normal orientation and moving said beam in an opposite second direction when said emulsion is in said inverted orientation.

13. The method of claim 9, wherein scanning is performed in a predetermined plane and the forming step further comprises focusing said image in said plane regardless of whether said emulsion is in said normal orientation or said inverted orientation.

14. The method of claim 13, wherein said master includes a carrier for said emulsion and said focusing comprises shifting the focal plane of said image by a distance substantially equal to the average thickness of said carrier when said emulsion is in said inverted orientation.

15. The method of claim 14, wherein said master is positioned at a predetermined location during the forming step and shifting is performed by moving at least one lens from a first position to a second position, said one lens being automatically moved from said second position to said first position upon removal of said master from said predetermined location.

16. The method of claim 9, wherein said master is positioned at a predetermined location during the forming step and inverting is performed by changing an inverting device from a first condition to a second condition, said inverting device being automatically changed from said second condition to said first condition upon removal of said master from said predetermined location.

17. A method of copying a master having an emulsion, comprising the steps of automatically detecting said emulsion; forming an image of said master on copy material including scanning said to generate printing signals, printing said image on said copy material using a printing beam controlled by said signals, and storing said signals between scanning and printing, the regulating step comprising entering said signals into storage in a first order when said emulsion is in said normal orientation and entering said signals into storage in a reverse second order when said emulsion is in said inverted orientation.

18. Apparatus for copying a master, particularly a transparent master, having an emulsion and a surface facing away from the emulsion, comprising means for automatically detecting the emulsion, and detecting means being in physical contact with the master and including means for mechanically sensing at least one of the emulsion and the surface which faces away therefrom; means for preventing application of excessive force in the physical contact to the master by said detecting means to thereby inhibit damaging the master; means for forming an image of the master on copy material; and means for automatically regulating said forming means in response to said detecting means so that the image is correctly oriented on the copy material regardless of whether the emulsion has a normal or inverted orientation in said forming means.

19. The apparatus of claim 18, wherein said forming means comprises means for scanning the master point-by-point and line-by-line, and means for printing the image on the copy material point-by-point and line-by-line, said scanning means including means for generating printing signals, and said printing means including means for producing a printing beam which is controlled by the printing signals, said scanning means being photoelectric.

20. The apparatus of claim 18, wherein said regulating means is arranged to regulate said printing means.

21. The apparatus of claim 18, wherein said forming means comprises means for scanning the master, means for focusing the image on said scanning means, and means for adjusting said focusing means so that the image can be focused on said scanning means regardless of whether the emulsion is in the normal or inverted orientation.

22. The apparatus of claim 18, wherein said forming means comprises means for scanning the master and generating printing signals, means for storing the printing signals, and means for printing the image on the copy material and including means for producing a printing beam which is controlled by printing signals in said storing means, said regulating means including means for electronically inverting the image when the emulsion is in the inverted orientation in said forming means.

23. The apparatus of claim 22, wherein said regulating means regulates said scanning and generating means so that the printing signals are issued in a first order when the emulsion is in the normal orientation and in a reverse second order when the emulsion is in the inverted orientation.

24. The apparatus of claim 22, wherein said regulating means regulates said storing means so that the printing signals are retrieved from said storing means in a first order when the emulsion is in the normal orientation and in a reverse second order when the emulsion is in the inverted orientation.

25. The apparatus of claim 22, wherein said regulating means regulates the printing beam so that the beam moves in a first direction when the emulsion is in the normal orientation and in an opposite second direction when the emulsion is in the inverted orientation.

* * * * *